United States Patent
Nishikawa et al.

(10) Patent No.: US 11,718,699 B2
(45) Date of Patent: Aug. 8, 2023

(54) RUBBER-STEEL CORD COMPOSITE AND PNEUMATIC TIRE USING THE SAME

(71) Applicant: Toyo Tire Corporation, Itami (JP)

(72) Inventors: Yuma Nishikawa, Itami (JP); Norio Minouchi, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 17/330,664

(22) Filed: May 26, 2021

(65) Prior Publication Data

US 2021/0388143 A1 Dec. 16, 2021

(30) Foreign Application Priority Data

Jun. 10, 2020 (JP) .................... 2020-101242

(51) Int. Cl.
| | | |
|---|---|---|
| *C08F 292/00* | (2006.01) | |
| *C08K 5/47* | (2006.01) | |
| *B60C 9/00* | (2006.01) | |
| *B60C 1/00* | (2006.01) | |

(52) U.S. Cl.
CPC .......... *C08F 292/00* (2013.01); *B60C 9/0007* (2013.01); *C08K 5/47* (2013.01); *B60C 2001/0066* (2013.01); *B60C 2009/0021* (2013.01)

(58) Field of Classification Search
CPC .... C08F 292/00; C08F 279/02; C08F 222/40; B60C 9/0007; B60C 2001/0066; B60C 2009/0021; B60C 1/0041; C08K 5/47; C08K 3/06; C08K 5/3415; C08K 5/34922; C08K 2201/019; C08L 7/00; C08L 61/06

See application file for complete search history.

(56) References Cited

U.S. PATENT DOCUMENTS

| | | | |
|---|---|---|---|
| 4,947,916 A | 8/1990 | Ishikawa et al. | |
| 2020/0109252 A1 | 4/2020 | Mukai | |
| 2021/0388143 A1 | 12/2021 | Nishikawa et al. | |
| 2021/0388144 A1 * | 12/2021 | Nishikawa | ................ C08L 7/00 |
| 2021/0388198 A1 * | 12/2021 | Nishikawa | .............. C08L 51/10 |

FOREIGN PATENT DOCUMENTS

| | | | | |
|---|---|---|---|---|
| EP | 2708529 A1 | 3/2014 | | |
| EP | 3808895 A1 * | 4/2021 | ........... | B60C 1/0041 |
| JP | H10-195237 A | 7/1998 | | |
| JP | 2003-82586 A | 3/2003 | | |
| JP | 2004-83766 A | 3/2004 | | |
| JP | 2005-225985 A | 8/2005 | | |
| JP | 2008-308632 A | 12/2008 | | |
| JP | 2019-77983 A | 5/2019 | | |
| WO | WO-2019240252 A1 * | 12/2019 | ........... | B60C 1/0041 |

OTHER PUBLICATIONS

Non-Final Office Action dated Oct. 14, 2022, issued in U.S. Appl. No. 17/330,709. (12 pages).
Non-Final Office Action dated May 26, 2023, issued in U.S. Appl. No. 17/330,687 (27 pages).

* cited by examiner

*Primary Examiner* — Angela C Scott
(74) *Attorney, Agent, or Firm* — WHDA, LLP

(57) ABSTRACT

A rubber-steel cord composite in which a rubber composition and a steel cord are vulcanized and adhere to each other, wherein the rubber composition contains 1 to 10 parts by mass of a vulcanizing agent, 0.1 to 5 parts by mass of N,N-dibenzylbenzothiazole-2-sulfenamide, and 0.1 to 5 parts by mass of a bismaleimide compound, with respect to 100 parts by mass of diene rubber containing natural rubber.

4 Claims, No Drawings

RUBBER-STEEL CORD COMPOSITE AND PNEUMATIC TIRE USING THE SAME

BACKGROUND OF THE INVENTION

1. Field of the Invention

The present disclosure relates to a rubber-steel cord composite and a pneumatic tire using the same.

2. Description of Related Art

In order for a metal reinforcing material-rubber composite in a belt layer of a pneumatic tire or the like to show a high reinforcing effect and obtain reliability, stable and strong adhesion is required between coated rubber and a metal reinforcing material. As a method for obtaining the metal reinforcing material-rubber composite having stable and strong adhesiveness between the coated rubber and the metal reinforcing material, a so-called direct vulcanization adhesion, in which the metal reinforcing material such as a steel cord plated with zinc, brass, or the like is embedded in the coated rubber in which sulfur is mixed with natural rubber, and the metal reinforcing material and the coated rubber adhere to each other simultaneously with vulcanization of the rubber during heating vulcanization, is widely used.

As a vulcanization accelerator, N,N-dicyclohexyl-2-benzothiazolesulfenamide is generally used for a rubber composition used for adhesion to the metal reinforcing material such as the steel cord or the like. However, a usage amount of the compound is required to be reduced due to an influence on a human body and an environment.

With respect to the above-described problem, for example, JP-A-2008-308632 discloses a rubber composition using N,N-dibenzylbenzothiazole-2-sulfenamide, but there is a room for further improvement in initial peeling force, moist heat peeling force, and peeling force after storage.

SUMMARY OF THE INVENTION

An object of the present disclosure is to provide a rubber-steel cord composite excellent in initial peeling force, moist heat peeling force, and peeling force after storage, and a pneumatic tire using the same, while reducing a usage amount of N,N-dicyclohexyl-2-benzothiazolesulfenamide.

While a rubber composition described in JP-A-2005-225985 contains a bismaleimide compound, the rubber composition described therein relates to a change in cross-linking formation of sulfur at a high temperature, does not describe moist heat deterioration, and also does not describe that the moist heat peeling force and the peeling force after storage can be improved by using N,N-dibenzylbenzothiazole-2-sulfenamide in combination with the bismaleimide compound as in the present disclosure.

While a steel cord-rubber composite described in JP-A-2019-77983 contains the bismaleimide compound in the rubber composition, the steel-rubber composite described therein is used to improve adhesiveness between the rubber and the steel cord by manufacturing the steel cord with a predetermined wire drawing method, and does not describe that the moist heat peeling force and the peeling force after storage can be improved by using N,N-dibenzylbenzothiazole-2-sulfenamide in combination with the bismaleimide compound as in the present disclosure.

A rubber-steel cord composite according to the present disclosure is a rubber-steel cord composite in which a rubber composition and a steel cord are vulcanized and adhere to each other, wherein the rubber composition contains 1 to 10 parts by mass of a vulcanizing agent, 0.1 to 5 parts by mass of N,N-dibenzylbenzothiazole-2-sulfenamide, and 0.1 to 5 parts by mass of a bismaleimide compound, with respect to 100 parts by mass of diene rubber containing natural rubber.

The bismaleimide compound can be at least one type selected from a group including 4,4'-diphenylmethane bismaleimide, bis-(3-ethyl-5-methyl-4-maleimidephenyl)methane, 2,2'-bis-[4-(4-maleimidephenoxy)phenyl]propane, and 1,3-bis(citraconimidemethyl)benzene.

The rubber composite does not contain cobalt organic acid, or even though the rubber composite contains the cobalt organic acid, a content thereof can be 3 parts by mass or less with respect to 100 parts by mass of diene rubber.

A pneumatic tire according to the present disclosure includes the rubber-steel cord composite.

According to a rubber-steel cord composite of the present disclosure, it is possible to obtain excellent initial peeling force, moist heat peeling force, and peeling force after storage while reducing a usage amount of N,N-dicyclohexyl-2-benzothiazolesulfenamide.

DESCRIPTION OF EMBODIMENTS

Hereinafter, matters related to implementation of the present disclosure will be described in detail.

A rubber-steel cord composite according to the present embodiment is a rubber-steel cord composite in which a rubber composition and a steel cord are vulcanized and adhere to each other, and the rubber composition contains 1 to 10 parts by mass of a vulcanizing agent, 0.1 to 5 parts by mass of N,N-dibenzylbenzothiazole-2-sulfenamide, and 0.1 to 5 parts by mass of a bismaleimide compound, with respect to 100 parts by mass of diene rubber containing natural rubber.

The rubber composition according to the present embodiment contains natural rubber (NR) as a rubber component, and may contain diene rubber other than natural rubber (NR). Examples of diene rubber include isoprene rubber (IR), butadiene rubber (BR), styrene-butadiene rubber (SBR), styrene-isoprene copolymer rubber, butadiene-isoprene copolymer rubber, styrene-isoprene-butadiene copolymer rubber, acrylonitrile butadiene rubber (NBR), chloroprene rubber (CR), butyl rubber (IIR), or the like. Among the above-described examples thereof, isoprene rubber (IR) and styrene-butadiene rubber (SBR) are desirable. That is, the rubber component is desirably natural rubber alone, a combination of natural rubber and isoprene rubber (IR), or a combination of natural rubber and styrene-butadiene rubber (SBR).

As the vulcanizing agent according to the present embodiment, sulfur components such as powdered sulfur, precipitated sulfur, colloidal sulfur, insoluble sulfur, highly dispersible sulfur can be used. A content thereof is not particularly limited as long as the content thereof is 1 to 10 parts by mass with respect to 100 parts by mass of diene rubber, and the content thereof is desirably 2 to 8 parts by mass.

The rubber composition according to the present embodiment contains N,N-dibenzylbenzothiazole-2-sulfenamide (DBBS) (another name: 2-[(dibenzylamino) thio]benzothiazole). N,N-dibenzylbenzothiazole-2-sulfenamide is a compound represented by [Chem. 1], and has little influence on the environment of a secondary amine generated during vulcanization reaction, with respect to N,N-dicyclohexyl-2-benzothiazolesulfenamide which may have an influence on the environment.

[Chem. 1]

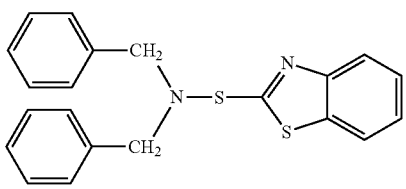

(1)

A content of N,N-dibenzylbenzothiazole-2-sulfenamide is not particularly limited as long as the content thereof is 0.1 to 5 parts by mass with respect to 100 parts by mass of diene rubber, is desirably 0.5 to 4 parts by mass, and is more desirably 1 to 4 parts by mass. When the content thereof is within the above-described range, excellent initial peeling force, moist heat peeling force, and peeling force after storage can be easily obtained.

The rubber composition according to the present embodiment desirably does not contain N,N-dicyclohexyl-2-benzothiazolesulfenamide. Even when the rubber composition contains N,N-dicyclohexyl-2-benzothiazolesulfenamide, a content thereof is desirably 1 part by mass or less, and more desirably 0.5 part by mass or less, with respect to 100 parts by mass of diene rubber.

As the bismaleimide compound according to the present embodiment, one or more types selected from compounds represented by [Chem. 2] can be used.

[Chem. 2]

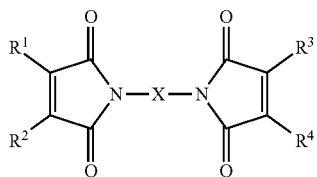

(2)

Here, in [Chem. 2], X represents an alkylene group of 2 to 4 carbon atoms, and a divalent hydrocarbon group of 6 to 29 carbon atoms including 1 to 4 phenylene groups or aromatic rings, and $R^1$ to $R^4$ respectively represent a hydrogen atom, an alkyl group of 1 to 5 carbon atoms, a —$NH_2$ group or a —$NO_2$ group, all of which are independently selected.

In [Chem. 2], as the alkylene group of 2 to 4 carbon atoms, which is represented by X, examples thereof include an ethylene group, a propylene group, a propane-2, 2-diyl group, or the like. As the divalent hydrocarbon group of 6 to 29 carbon atoms including 1 to 4 aromatic rings, examples thereof include a methylenebis (phenylene) group, a phenylenebis (methylene) group, a phenoxyphenyl group, or the like. The aromatic ring may be bonded by —O—, —S—, —SS—, —$SO_2$—, or the like. Among the above-described X, a hydrocarbon group of 8 to 20 carbon atoms including 1 to 4 phenylene groups or aromatic rings is desirable, and a hydrocarbon group of 8 to 13 carbon atoms including 1 to 4 phenylene groups or aromatic rings is more desirable. In [Chem. 2], X may include a substituent. As the substituent, examples thereof include an alkyl group of 1 to 3 carbon atoms, —$NH_2$, —$NO_2$, —F, —Cl, —Br, or the like. In [Chem. 2], as the alkyl group of 1 to 5 carbon atoms represented by $R^1$ to $R^4$, examples thereof include a methyl group, an ethyl group, a propyl group, or the like.

As the compounds represented by [Chem. 2], examples thereof include N,N'-1,2-ethylene bismaleimide; N,N'-1,2-propylene bismaleimide; 4,4'-diphenylmethane bismaleimide; N,N'-m-phenylene bismaleimide; bis-(3-ethyl-5-methyl-4-maleimidephenyl)methane; 2,2'-bis-[4-(4-maleimidephenoxy)phenyl]propane; m-phenylene bis (methylene) bismaleimide; m-phenylenebis (methylene) biscitraconimide; 1,1'-(methylenedi-4,1-phenylene)bismaleimide; 1,2-bis (citraconimidemethyl) benzene; 1,3-bis(citraconimidemethyl)benzene; 1,4-bis(citraconimidemethyl) benzene; 2,3-bis(citraconimidemethyl)toluene; 2,4-bis (citraconimidemethyl)toluene; 2,5-bis (citraconimidemethyl)toluene; 2,6-bis (citraconimidemethyl)toluene; and a bis(citraconimideethyl) compound or the like corresponding thereto. Among the compounds, 4,4'-diphenylmethane bismaleimide, bis-(3-ethyl-5-methyl-4-maleimidephenyl)methane, 2,2'-bis-[4-(4-maleimidephenoxy)phenyl]propane, and 1,3-bis(citraconimidemethyl)benzene are desirable. As the above-described compounds, a commercially available compound may be used, and for example, "BMI" (4,4'-diphenylmethane bismaleimide), "BMI-70" (bis-(3-ethyl-5-methyl-4-maleimidephenyl)methane), "BMI-80" (2,2'-bis-[4-(4-maleimidephenoxy)phenyl]propane) manufactured by K-I Chemical Industry Co., Ltd., "Perkalink 900" (1,3-bis(citraconimidemethyl)benzene) manufactured by Flexsys, or the like can be used.

A content of the bismaleimide compound is not particularly limited as long as the content thereof is 0.1 to 5 parts by mass with respect to 100 parts by mass of diene rubber. Specifically, the content thereof is desirably 0.5 to 4 parts by mass, and more desirably 1 to 3 parts by mass. When the content of the bismaleimide compound is within the above-described range, excellent initial peeling force, moist heat peeling force, and peeling force after storage can be easily obtained.

A melamine derivative (methylene donor) and a resorcinol compound (methylene receptor) can be mixed with the rubber composition according to the present embodiment. A hydroxyl group of the resorcinol compound reacts with a methylene group of the melamine derivative, thereby making it possible to improve adhesiveness between the rubber and the steel cord and to prevent deterioration in the adhesiveness therebetween caused by load and heat generated by tire traveling.

As the melamine derivative, examples thereof include hexamethylol melamine; hexamethoxymethyl melamine; pentamethoxymethylol melamine; hexaethoxymethyl melamine; hexakis-(methoxymethyl) melamine; N,N',N''-trimethyl-N,N',N''-trimethylol melamine; N,N',N''-trimethylol melamine; N-methylol melamine; N,N'-(methoxymethyl) melamine; N,N',N''-tributyl-N,N',N''-trimethylol melamine or the like. Among the examples thereof, hexamethoxymethyl melamine is particularly desirable.

A content of the melamine derivative is not particularly limited. The content thereof is desirably 0.1 to 5 parts by mass, more desirably 0.5 to 4 parts by mass, and much more desirably 1 to 3 parts by mass, with respect to 100 parts by mass of diene rubber. When the content thereof is within the above-described range, excellent initial peeling force, moist heat peeling force, and peeling force after storage can be easily obtained.

As the resorcinol compound, examples thereof include resorcinol and a resorcinol derivative. As the resorcinol derivative, resorcinol-formalin resin obtained by condensation of resorcinol and formaldehyde, resorcinol-alkylphenol-formalin resin in which a part of the repeating unit of resorcinol-formalin resin is alkylated (hereinafter, also referred to as modified resorcinol-formalin resin), and phenolic resin such as phenol-formalin resin, cresol-formalin resin, or the like obtained by condensation of a type of phenol (phenol, cresol, or the like) and aldehyde can be used. As the modified resorcinol-formalin resin, examples thereof include Sumikanol 620 manufactured by Sumitomo Chemical Co., Ltd., Penacolite resins B-16S, B-18S, B-19S, and B-20 manufactured by Indspec Chemical Corp., or the like. From a perspective of compatibility with a rubber component and other components, and precision and reliability of the resin after curing, resorcinol or resorcinol-alkylphenol-formalin resin is desirable.

A content of the resorcinol compound is not particularly limited. The content thereof is desirably 0.1 to 5 parts by mass, more desirably 0.5 to 4 parts by mass, and much more desirably 1 to 3 parts by mass, with respect to 100 parts by mass of diene rubber. When the content thereof is within the above-described range, excellent initial peeling force, moist heat peeling force, and peeling force after storage can be easily obtained.

A content ratio of the melamine derivative and the resorcinol compound (melamine derivative/resorcinol compound) is not particularly limited. The content ratio thereof is desirably 0.25 to 4, and more desirably 0.5 to 2.

The rubber composition according to the present embodiment may be mixed with an organic acid cobalt salt as an adhesion improver for the steel cord, but the cobalt organic acid is required to reduce a usage amount thereof due to an influence on a human body and an environment, such that it is desirable not to contain the cobalt organic acid. Even though the cobalt organic acid is contained, a content thereof is desirably 3 parts by mass or less (0.29 parts by mass or less in terms of metal content) with respect to 100 parts by mass of diene rubber. By using the N,N-dibenzylbenzothiazole-2-sulfenamide in combination with the bismaleimide compound, excellent initial peeling force, moist heat peeling force, and peeling force after storage can be easily obtained even though the content of the cobalt organic acid is reduced.

As the organic acid cobalt salt, examples thereof include cobalt naphthenate, cobalt stearate, cobalt oleate, cobalt neodecanoate, cobalt rosinate, cobalt borate, cobalt maleate, or the like. Among the examples thereof, cobalt naphthenate and cobalt stearate are particularly desirable from a viewpoint of processability.

In the rubber composition according to the present embodiment, in addition to each of the above-described components, formulated chemicals such as a reinforcing filler, a process oil, zinc oxide, stearic acid, a softener, a plasticizer, a wax, an anti-aging agent, a vulcanization accelerator, or the like, all of which are used in the normal rubber industry, can be appropriately mixed within a normal range.

As the reinforcing filler, it is desirable to use carbon black and/or silica. That is, the reinforcing filler may be carbon black alone, silica alone, or a combination of carbon black and silica. Desirably, carbon black alone or the combination of carbon black and silica is used. A content of the reinforcing filler is not particularly limited. For example, the content thereof is desirably 10 to 140 parts by mass, more desirably 20 to 100 parts by mass, and much more desirably 30 to 80 parts by mass, with respect to 100 parts by mass of diene rubber.

Carbon black is not particularly limited, and various known varieties can be used for carbon black. A content of carbon black is desirably 5 to 100 parts by mass, and more desirably 20 to 80 parts by mass, with respect to 100 parts by mass of diene rubber.

Silica is also not particularly limited, and wet silica such as wet sedimentation method silica and wet gel method silica is desirably used for silica. When silica is mixed, a content thereof is desirably 5 to 40 parts by mass, and more desirably 5 to 30 parts by mass, with respect to 100 parts by mass of diene rubber.

The rubber composition according to the present embodiment can be prepared by kneading according to a related-art method by using a normally used mixing machine such as a Banbury mixer, a kneader, a roll, or the like.

The rubber composition according to the present embodiment is used as a coating (topping) rubber of a steel cord used as a reinforcing material in a belt layer and a carcass layer of a pneumatic tire. That is, the rubber composition according to the present embodiment is used as a rubber composition for coating a belt cord and/or a carcass cord. The pneumatic tire can be manufactured in such a manner that the rubber composition is used to manufacture a steel cord topping texture by a topping device such as a steel calendar or the like according to a related-art method, the manufactured steel cord topping texture is used as the belt layer and/or the carcass layer to manufacture an unvulcanized tire, and vulcanization molding is performed thereon according to a related-art method.

The pneumatic tire may be a passenger car tire or a heavy-duty tire, and is not particularly limited. A structure of the pneumatic tire is well known and is not particularly limited. In general, the pneumatic tire includes: a pair of left and right bead portions and sidewalls; a tread provided between both sidewalls so as to connect radial outward ends of the left and right sidewalls; and at least one carcass layer extending across the pair of left and right bead portions. In the carcass layer, both ends of the carcass layer are locked by the bead portions from the tread to the sidewall to reinforce the respective portions. The belt layer is usually provided in two or more layers between the carcass layer and the tread rubber on an outer peripheral side of the carcass layer in the tread, and reinforces the tread on the outer peripheral side of the carcass layer. In the present embodiment, when the rubber composition is used for the coated rubber of the steel cord, the rubber composition may be applied to either one of the belt layer and the carcass layer, or may be applied to both thereof.

EXAMPLES

Hereinafter, Examples of the present disclosure will be shown, and the present disclosure is not limited thereto.

The Banbury mixer is used. According to the formulation (parts by mass) shown in Table 1 below, first, in a first mixing step, a component excluding sulfur and the vulcanization accelerator are added and mixed (discharge temperature=160° C.). Next, sulfur and the vulcanization accelerator are added to the obtained mixture and mixed therewith in a final mixing step (discharge temperature=90° C.), thereby preparing the rubber composition.

Details of each component in Table 1 are described as follows.

Natural rubber: RSS #3
Isoprene rubber: "IR2200" manufactured by JSR Co., Ltd.

Carbon black: "Seast 300" manufactured by Tokai Carbon Co., Ltd.
Zinc oxide: "Zinc oxide No. 3" manufactured by Mitsui Mining & Smelting Co., Ltd.
Anti-aging agent: "Santoflex 6PPD" manufactured by Flexis Co., Ltd.
Cobalt stearate: "Cobalt stearate" manufactured by Japan Energy Co., Ltd. (Co content 9.5% by mass)
Melamine derivative: Hexamethoxymethyl melamine, "Silets 963L" manufactured by Mitsui Cytec Co., Ltd.
Resorcinol compound: Resorcinol-alkylphenol-formalin resin, "Sumikanol 620" manufactured by Sumitomo Chemical Co., Ltd.
Bismaleimide compound 1: 4,4'-diphenylmethane bismaleimide, "BMI" manufactured by KI-Chemical Industry Co., Ltd.
Bismaleimide compound 2: 1,3-bis(citraconimide methyl)benzene, "Perkalink 900" manufactured by LANXESS
Bismaleimide compound 3: bis-(3-ethyl-5-methyl-4-maleimidephenyl)methane, "BMI-70" manufactured by KI-Chemical Industry Co., Ltd.
Bismaleimide compound 4: 2,2'-bis-[4-(4-maleimide phenoxy)phenyl]propane, "BMI-80" manufactured by KI-Chemical Industry Co., Ltd.
Insoluble sulfur: "Crystex HS OT-20" manufactured by Flexis Co., Ltd. (sulfur content 80% by mass)
Vulcanization accelerator 1: N,N-dicyclohexyl-2-benzothiazolesulfenamide, "Noxeller DZ-G" manufactured by Ouchi Shinko Chemical Industrial Co., Ltd.
Vulcanization accelerator 2: N,N-dibenzylbenzothiazole-2-sulfenamide An unvulcanized sample of a rubber-steel cord composite is prepared by using each of the obtained rubber compositions. Specifically, both sides of belt steel cords (3×0.20+ 6×0.35 mm structure, copper/zinc=64/36 (a mass ratio), and brass plating of an adhesion amount of 5 g/kg) arranged in parallel with a driving density of 12 pieces/25 mm are coated with a rubber sheet having a thickness of 1 mm formed of each of the rubber compositions, and these two sheets are laminated so that the cords are parallel to each other, thereby preparing an unvulcanized sample for a peeling adhesion test. The initial peeling force, the moist heat peeling force, and the peeling force after storage are evaluated by using the obtained unvulcanized sample. An evaluation method is described as follows.

Initial peeling force: after the unvulcanized sample is prepared, the unvulcanized sample is vulcanized at 150° C.×30 minutes, the peeling adhesion test is performed by using autograph "DCS500" manufactured by Shimadzu Corporation, and a maximum intensity at the time of peeling is measured as the initial peeling force. The initial peeling force is displayed with an index when the peeling force of Comparative Example 1 is set to 100, and it is indicated that as a value is higher, the initial peeling force is excellent and adhesiveness is excellent.

Moist heat peeling force: after the unvulcanized sample is prepared, the unvulcanized sample is vulcanized at 150° C.×30 minutes. After leaving a vulcanized test piece in saturated steam at 105° C. for 96 hours, a peeling test between the steel cords having two layers is performed by using the autograph "DCS500" manufactured by Shimadzu Corporation, and a maximum intensity until breakage is measured as the moist heat peeling force. The moist heat peeling force is displayed with an index when the moist heat peeling force of Comparative Example 1 is set to 100, and it is indicated that as a value is higher, the moist heat peeling force is excellent and moist heat adhesiveness is excellent.

Peeling force after storage: First, the unvulcanized sample is prepared. After leaving the unvulcanized sample in a constant temperature and humidity chamber at 40° C.×95% RH for 5 days, the unvulcanized sample is vulcanized under the conditions of 150° C.×30 minutes. The peeling test between the steel cords having two layers is performed by using the autograph "DCS500" manufactured by Shimadzu Corporation, and a maximum intensity until breakage is measured as the peeling force after storage. The peeling force after storage is displayed with an index when the peeling force after storage of Comparative Example 1 is set to 100, and it is indicated that as a value is higher, the peeling force after storage is excellent and adhesiveness after storage is excellent.

TABLE 1

| | Comparative Example | | | | | | Example | | | | | | | | | | | | |
|---|---|---|---|---|---|---|---|---|---|---|---|---|---|---|---|---|---|---|---|
| | 1 | 2 | 3 | 4 | 5 | 6 | 1 | 2 | 3 | 4 | 5 | 6 | 7 | 8 | 9 | 10 | 11 | 12 | 13 |
| Natural rubber | 100 | 100 | 100 | 100 | 100 | 100 | 100 | 100 | 100 | 100 | 100 | 100 | 100 | 100 | 100 | 100 | 90 | 100 | 100 |
| Isoprene rubber | — | — | — | — | — | — | — | — | — | — | — | — | — | — | — | — | 10 | — | — |
| Carbon black | 60 | 60 | 60 | 60 | 60 | 60 | 60 | 60 | 60 | 60 | 60 | 60 | 60 | 60 | 60 | 60 | 60 | 60 | 60 |
| Zinc oxide | 8 | 8 | 8 | 8 | 8 | 8 | 8 | 8 | 8 | 8 | 8 | 8 | 8 | 8 | 8 | 8 | 8 | 8 | 8 |
| Anti-aging agent | 2 | 2 | 2 | 2 | 2 | 2 | 2 | 2 | 2 | 2 | 2 | 2 | 2 | 2 | 2 | 2 | 2 | 2 | 2 |
| Cobalt stearate | 2 | 2 | 2 | 2 | — | 2 | 2 | 2 | 2 | 2 | 1 | 0.5 | — | 2 | 2 | 2 | 2 | 2 | 2 |
| Melamine derivative | 2 | 2 | 2 | 2 | 2 | 2 | 2 | 2 | 2 | 2 | 2 | 2 | 2 | 2 | 2 | 2 | 2 | 2 | 2 |
| Resorcinol compound | 2 | 2 | 2 | 2 | 2 | 2 | 2 | 2 | 2 | 2 | 2 | 2 | 2 | 2 | 2 | 2 | 2 | 2 | 2 |
| Bismaleimide compound 1 | — | 1 | — | — | — | — | 1 | — | — | — | — | — | — | — | — | — | — | — | — |
| Bismaleimide compound 2 | — | — | — | 1 | 1 | 1 | — | 1 | 1 | 1 | 1 | 1 | 1 | 0.5 | 2 | 1 | 1 | — | — |
| Bismaleimide compound 3 | — | — | — | — | — | — | — | — | — | — | — | — | — | — | — | — | — | 1 | — |
| Bismaleimide compound 4 | — | — | — | — | — | — | — | — | — | — | — | — | — | — | — | — | — | — | 1 |

TABLE 1-continued

|  | Comparative Example | | | | | | Example | | | | | | | | | | | | |
| --- | --- | --- | --- | --- | --- | --- | --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 | 7 | 8 | 9 | 10 | 11 | 12 | 13 |
| Insoluble sulfur | 6 | 6 | 6 | 6 | 6 | 4.8 | 6 | 6 | 6 | 6 | 6 | 6 | 6 | 6 | 6 | 4.8 | 6 | 6 | 6 |
| Vulcanization accelerator 1 | 1 | 1 | — | 1 | 1 | 1 | — | — | — | — | — | — | — | — | — | — | — | — | — |
| Vulcanization accelerator 2 | — | — | 1 | — | — | — | 1 | 1 | 2 | 4 | 1 | 1 | 1 | 1 | 1 | 1 | 1 | 1 | 1 |
| Initial peeling force | 100 | 105 | 96 | 105 | 100 | 100 | 120 | 115 | 120 | 135 | 110 | 115 | 100 | 105 | 125 | 105 | 105 | 120 | 125 |
| Moist heat peeling force | 100 | 166 | 98 | 150 | 80 | 130 | 185 | 170 | 172 | 176 | 165 | 145 | 110 | 150 | 175 | 145 | 156 | 190 | 180 |
| Peeling force after storage | 100 | 120 | 105 | 105 | 85 | 85 | 135 | 130 | 130 | 135 | 130 | 120 | 105 | 130 | 150 | 110 | 130 | 125 | 115 |

The results are as shown in Table 1. Comparative Example 2 is an example in which the bismaleimide compound is added to the formulation of Comparative Example 1. In comparison with Comparative Example 1, the initial peeling force is improved by 5%, the moist heat peeling force is improved by 66%, and the peeling force after storage is improved by 20%.

Comparative Example 3 is an example in which N,N-dibenzylbenzothiazole-2-sulfenamide is mixed instead of N,N-dicyclohexyl-2-benzothiazolesulfenamide in the formulation of Comparative Example 1. In comparison with Comparative Example 1, the peeling force after storage is improved by 5%, but the initial peeling force and the moist heat peeling force deteriorate.

On the other hand, Example 1 is an example in which N,N-dibenzylbenzothiazole-2-sulfenamide is mixed instead of N,N-dicyclohexyl-2-benzothiazolesulfenamide in the formulation of Comparative Example 2. In comparison with Comparative Example 2, the initial peeling force is improved by 15%, the moist heat peeling force is improved by 19%, and the peeling force after storage is improved by 15%. From the result, it can be seen that a synergistic effect can be obtained when N,N-dibenzylbenzothiazole-2-sulfenamide is used in combination with the bismaleimide compound.

The rubber-steel cord composite of the present disclosure can be used for a belt layer of a passenger car tire, a belt of a large tire for a truck, a bus, or the like, a carcass, a chafer layer, or the like.

What is claimed is:

1. A rubber-steel cord composite in which a rubber composition and a steel cord are vulcanized and adhere to each other,
    wherein the rubber composition contains 1 to 10 parts by mass of a vulcanizing agent, 0.1 to 5 parts by mass of N,N-dibenzylbenzothiazole-2-sulfenamide, and 0.5 to 2 parts by mass of a bismaleimide compound, with respect to 100 parts by mass of diene rubber containing natural rubber, wherein the bismaleimide compound is at least one type selected from a group including 4,4'-diphenylmethane bismaleimide, bis-(3-ethyl-5-methyl-4-maleimidephenyl)methane, 2,2'-bis-[4-(4-maleimidephenoxy)phenyl]propane, and 1,3-bis(citraconimidemethyl)benzene.

2. The rubber-steel cord composite according to claim 1,
    wherein cobalt organic acid is not contained, or even though the cobalt organic acid is contained, a content thereof is 3 parts by mass or less with respect to 100 parts by mass of diene rubber.

3. A pneumatic tire comprising the rubber-steel cord composite according to claim 2.

4. A pneumatic tire comprising the rubber-steel cord composite according to claim 1.

* * * * *